United States Patent
Nilsson et al.

(10) Patent No.: US 9,457,750 B2
(45) Date of Patent: Oct. 4, 2016

(54) METHOD AND SYSTEM OF A VEHICLE FOR REVERSIBLE SEAT BELT RETRACTION

(71) Applicant: VOLVO CAR CORPORATION, Gothenburg (SE)

(72) Inventors: Par Nilsson, Gothenburg (SE); Peter Harda, Torslanda (SE); Anders Axelson, Torslanda (SE); Stefan Berge, Vastra Frolunda (SE)

(73) Assignee: VOLVO CAR CORPORATION (SE)

( * ) Notice: Subject to any disclaimer, the term of this patent is extended or adjusted under 35 U.S.C. 154(b) by 5 days.

(21) Appl. No.: 14/282,455

(22) Filed: May 20, 2014

(65) Prior Publication Data

US 2014/0350796 A1    Nov. 27, 2014

(30) Foreign Application Priority Data

May 27, 2013  (EP) ..................................... 13169356

(51) Int. Cl.
| | |
|---|---|
| B60R 21/013 | (2006.01) |
| B60R 22/34 | (2006.01) |
| B60R 21/0132 | (2006.01) |
| B60R 21/16 | (2006.01) |
| B60R 21/0134 | (2006.01) |

(Continued)

(52) U.S. Cl.
CPC ......... *B60R 21/013* (2013.01); *B60R 21/0132* (2013.01); *B60R 21/0134* (2013.01); *B60R 21/16* (2013.01); *B60R 22/34* (2013.01); *B60R 2021/0018* (2013.01); *B60R 2021/01272* (2013.01); *B60R 2021/01304* (2013.01); *B60R 2021/01317* (2013.01)

(58) Field of Classification Search
None
See application file for complete search history.

(56) References Cited

U.S. PATENT DOCUMENTS

| | | | |
|---|---|---|---|
| 6,616,186 B1 * | 9/2003 | Midorikawa ........... | B60R 21/01 280/735 |
| 2002/0163170 A1 * | 11/2002 | Foo ....................... | B60R 21/013 280/735 |

(Continued)

FOREIGN PATENT DOCUMENTS

| | | |
|---|---|---|
| EP | 2520472 A2 | 11/2012 |
| WO | 2008041904 A1 | 4/2008 |
| WO | WO 2008041904 A1 * | 4/2008 |

OTHER PUBLICATIONS

Extended European Search Report Dated Oct. 24, 2013, Application No. 13169356.6-1503, Applicant Volvo Car Corporation, 6 Pages.

*Primary Examiner* — Rami Khatib
*Assistant Examiner* — Jeffrey Boomer
(74) *Attorney, Agent, or Firm* — Brooks Kushman P.C.

(57) ABSTRACT

A method performed by a retraction control system of a vehicle for controlling refraction of a seat belt of a reversible seat belt refractor arrangement for a vehicle occupant is provided. The control system determines fulfillment of an activation condition based on an initiating input derived from a vehicle situation sensing system, which initiating input indicates that the vehicle, at an initiating time instant, is considered likely to be, or is about to become, involved in a hazardous situation and/or uncomfortable dynamic situation. The control system generates an activation signal utilizable for initiation of retraction of the seat belt. If the control system determines absence of fulfillment of a confirming condition within a predetermined confirming time period, and/or if the control system determines fulfillment of an abort condition within a predetermined abort time period, the control system generates a deactivation signal utilizable for aborting the initiation.

16 Claims, 5 Drawing Sheets

(51) Int. Cl.
*B60R 21/00* (2006.01)
*B60R 21/01* (2006.01)

(56) References Cited

U.S. PATENT DOCUMENTS

| | | | |
|---|---|---|---|
| 2003/0114971 A1* | 6/2003 | Caruso | B60R 21/0133 701/45 |
| 2005/0139408 A1* | 6/2005 | Bullinger et al. | 180/268 |
| 2006/0145463 A1* | 7/2006 | Isaji et al. | 280/806 |
| 2007/0017726 A1 | 1/2007 | Takemura | |
| 2007/0158488 A1* | 7/2007 | Bogenrieder | B60R 21/0132 242/381.1 |
| 2007/0282505 A1* | 12/2007 | Bolton et al. | 701/45 |
| 2008/0023246 A1* | 1/2008 | Gillet | 180/268 |
| 2008/0033616 A1* | 2/2008 | Gillet | 701/45 |
| 2009/0125237 A1 | 5/2009 | Kitagawa et al. | |
| 2011/0098893 A1* | 4/2011 | Hashimoto | 701/46 |
| 2012/0256404 A1* | 10/2012 | Rauh | B60R 21/0132 280/735 |
| 2014/0062070 A1* | 3/2014 | Togawa | B60R 21/0132 280/730.2 |
| 2016/0046251 A1* | 2/2016 | Wolkenstein | B60L 3/0007 701/46 |
| 2016/0129879 A1* | 5/2016 | Harda | B60N 2/42727 297/216.13 |
| 2016/0129881 A1* | 5/2016 | Harda | B60R 21/013 701/45 |

* cited by examiner

Fig. 4 ized seatbelt retractors and movable support surfaces, e.g., knee padding and movable headrests. The reversible restraint systems are commonly designed to apply a restraining force to the vehicle occupant in a critical situation, and to remove the restraining force when and if the critical situation is over. Additionally, such restraint systems may be intended to provide additional support for bracing a vehicle occupant during uncomfortable vehicle dynamic situations. In most of such cases, there is also an increased risk of an accident occurring even if a collision is not likely.

METHOD AND SYSTEM OF A VEHICLE FOR REVERSIBLE SEAT BELT RETRACTION

CROSS-REFERENCE TO RELATED APPLICATIONS

This application claims foreign priority benefits under 35 U.S.C. §119(a)-(d) to European patent application number EP 13169356.6, filed May 27, 2013, which is incorporated by reference in its entirety.

TECHNICAL FIELD

The present disclosure relates to a retraction control system of a vehicle and a method performed by said system for controlling retraction of a seat belt of a reversible seat belt refractor arrangement for a vehicle occupant.

BACKGROUND

Vehicle manufacturers of today increasingly focus on improved safety of vehicle occupants. If it appears likely or unavoidable that a vehicle will be involved in a collision situation, safety devices such as airbags may be activated in order to protect the vehicle occupant from the consequences thereof. Current vehicles typically employ accelerometers that measure decelerations acting on the vehicle body in the event of a collision. Radar, lidar, and/or vision-based pre-crash sensing systems are furthermore commonly utilized to deploy safety devices at an early stage in a collision situation, or even before the actual impact. It is also known to activate safety devices in response to detected uncomfortable and/or hazardous vehicle dynamics situations, such as under-steer, over-steer, skidding, emergency braking or evasive maneuvering.

In addition to airbags, safety devices may be represented by reversible restraint systems such as motorized seatbelt retractors and movable support surfaces, e.g., knee padding and movable headrests. The reversible restraint systems are commonly designed to apply a restraining force to the vehicle occupant in a critical situation, and to remove the restraining force when and if the critical situation is over. Additionally, such restraint systems may be intended to provide additional support for bracing a vehicle occupant during uncomfortable vehicle dynamic situations. In most of such cases, there is also an increased risk of an accident occurring even if a collision is not likely.

WO 2008/041904, for instance, discloses a control system for controlling a reversible restraint arrangement for a vehicle occupant. The control system is operable to generate an output signal to control the reversible restraint arrangement if it is determined from the character of the road ahead of the vehicle that activation of the reversible restraint arrangement is required. The output signal is generated if it appears that the vehicle is likely to be involved in a hazardous situation or an uncomfortable dynamic situation. Accordingly, situations in which a reversible restraint system is to be deployed may be detected at an early stage, and hence the reversible restraint system may be applied gradually.

However, although the control system of WO 2008/041904 enables less discomfort or alarm to vehicle occupants by avoiding reversible restraint systems being applied quickly and without warning, the vehicle occupants may still experience discomfort from the reversible restraint systems.

SUMMARY

It is therefore an object of embodiments herein to provide an improved way of controlling retraction of a seat belt of a reversible seat belt retractor arrangement for a vehicle occupant of a vehicle, which vehicle is considered likely to be, or is about to become, involved in a hazardous situation and/or uncomfortable dynamic situation.

According to a first aspect of embodiments herein, the object is achieved by a method performed by a retraction control system of a vehicle for controlling retraction of a seat belt of a reversible seat belt retractor arrangement for a vehicle occupant. The retraction control system determines fulfillment of an activation condition based on an initiating input derived from a vehicle situation sensing system, which initiating input indicates that the vehicle, at an initiating time instant, is considered likely to be, or is about to become, involved in a hazardous situation and/or uncomfortable dynamic situation. The refraction control system generates an activation signal utilizable for initiation of retraction of the seat belt. If the retraction control system determines absence of fulfillment of a confirming condition within a predetermined confirming time period, and/or if the retraction control system determines fulfillment of an abort condition within a predetermined abort time period, the retraction control system generates a deactivation signal utilizable for aborting the initiation. The confirming time period and the abort time period respectively fall within a predetermined non-restraining time period characterizing the reversible seat belt retractor arrangement, during which non-restraining time period the reversible seat belt refractor arrangement is unable to apply a noticeable restraining force, by means of the seat belt, to the vehicle occupant.

Thereby, since the confirming time period and the abort time period respectively do not extend beyond the non-restraining time period during which the reversible seat belt retractor arrangement is unable to apply a noticeable restraining force to the vehicle occupant, the initiation of refraction of the seat belt may, if absence of fulfillment of the confirming condition within the confirming time period is determined and/or if fulfillment of the abort condition within the abort time period is determined, be aborted before the vehicle occupant even notices the initiated refraction. That is, by making use of the inability of the reversible seat belt retractor arrangement to momentarily apply a noticeable restraining force of the seat belt to the vehicle occupant, i.e., making use of the delay occurring after generation of the activation signal until application of the restraining force is possible, thus utilizing the reaction time of e.g., an electrical motor adapted to apply the restraining force of the seat belt and/or utilizing the delay associated with the "slack" of the seat belt on a reel of the reversible seat belt retractor arrangement resulting from the seat belt being relatively loosely reeled and/or not being fully stretched on the reel, the retraction control system is given time to reconsider whether or not to abort the initiated retraction before the vehicle occupant is affected by a noticeable restraining force. Accordingly, the introduced retraction control system quickly reacts to an imminent hazardous situation and/or uncomfortable dynamic situation by initiating refraction at an early stage. At the same time, the imminent hazardous situation and/or uncomfortable dynamic situation may be re-evaluated and the initiated retraction potentially aborted prior to the vehicle occupant experiencing discomfort by a restraining force of the seat belt. For that reason, controlling retraction of a seat belt of a reversible seat belt refractor arrangement for a vehicle occupant of a vehicle, which vehicle is considered likely to be, or is about to become, involved in a hazardous situation and/or uncomfortable dynamic situation, has been improved.

The technical features and corresponding advantages of the above mentioned method will be discussed in further detail in the following.

By introducing a method performed by a retraction control system of a vehicle for controlling retraction of a seat belt of a reversible seat belt retractor arrangement for a vehicle occupant, a vehicle occupant safety approach applicable during an imminent critical vehicle situation, is provided. The referred to vehicle may be any arbitrary vehicle, for instance an engine-propelled vehicle, such as e.g., a car, truck, lorry, van, bus, tractor, military vehicle, air plane, vessel such as e.g., a ship, a golf cart, a rail-bound vehicle, such as e.g., a train or tram. Furthermore, the vehicle occupant may refer to any arbitrary potential driver or passenger of the vehicle. The reversible seat belt retractor arrangement may refer to any arbitrary seat belt retractor arrangement capable of applying a restraining force to a vehicle occupant being subjected to an imminent hazardous situation and/or uncomfortable dynamic situation, which restraining force may be removed when and/or if said situation is over. Accordingly, rather than referring to a seat belt refractor arrangement comprising e.g., a cartridge activated retractor that may retract the seatbelt quickly by force of explosive, hence not being considered reversible, a seat belt retractor arrangement of the present disclosure may accomplish e.g., a motor driven retraction of the seat belt electrically and/or pneumatically, thus providing a reversible solution. Furthermore, the retraction control system may be represented by e.g., a retraction unit comprised in one or several suitable electronic devices, such as e.g., one or several integrated arbitrary electronic control unit (ECU) nodes, e.g., an airbag node or main central node, or a control unit associated with the reversible seat belt retractor arrangement.

By the retraction control system determining fulfillment of an activation condition based on an initiating input derived from a vehicle situation sensing system, which initiating input indicates that the vehicle, at an initiating time instant, is considered likely to be, or is about to become, involved in a hazardous situation and/or uncomfortable dynamic situation, the retraction control system is provided with relevant input data regarding an imminent critical situation which is utilizable for determining fulfillment of the activation condition. The vehicle situation sensing system may for instance refer to one or a combination of sensors of the vehicle, known in the art, adapted to monitor whether the vehicle is considered likely to be, or is about to become, involved in a hazardous situation and/or uncomfortable dynamic situation. Furthermore, data from various sensors may be fused together to provide input from multiple sensors. The initiating input may for instance comprise one or a combination of signals, parameters, settings in a table of a control unit memory, flags etc. as known in the art, derivable e.g. from functionality, communication buses and/or e.g., ECUs already available in the vehicle. Accordingly, determining fulfillment of the activation condition may for instance be implemented by receiving said signals, and/or reading said parameters, settings or flags. The initiating time instant may be considered the point in time, when the initiating input starts to indicate that the vehicle is considered likely to be, or is about to become, involved in a hazardous situation and/or uncomfortable dynamic situation. The hazardous situation may for instance refer to an imminent vehicle collision situation, and the uncomfortable dynamic situation for instance to a vehicle dynamics situation such as under-steer, over-steer, skidding, emergency braking, evasive maneuvering or a situation in which vehicle kinematics increases the risk of the occupant being less than optimally positioned relative the vehicle restraint systems. Furthermore, "based on" is throughout this disclosure intended to be interpreted to likewise include at least "utilizing", "considering" and "taking into account".

By the retraction control system generating an activation signal utilizable for initiation of retraction of the seat belt, retraction of the seat belt may be initiated once fulfillment of the activation condition has been determined. Thereby, retraction may be initiated at an early stage, without waiting for re-evaluation and/or reconsideration of whether the vehicle is considered likely to be, or is about to become, involved in a hazardous situation and/or uncomfortable dynamic situation. Initiation of retraction may refer to start of retraction of the seat belt, although due to the reversible seat belt arrangement being unable to, when receiving the activation signal, momentarily apply a restraining force noticeable to the vehicle occupant, the vehicle occupant will initially not experience discomfort from the seat belt. The activation signal may for instance be provided to the reversible seat belt retractor arrangement by the retraction control system being directly connected thereto, or by being provided via a communication bus, and/or the activation signal may be represented by e.g., a parameter, a setting in a table in a control unit memory or by a flag, etc.

By the retraction control system determining if there is absence of fulfillment of a confirming condition within a predetermined confirming time period, it is judged whether there is absence of fulfillment of a confirming condition before the confirming time period lapses. That is, the refraction control system gives the opportunity, within a set time frame, of taking into account input from reconsideration, of whether the vehicle is considered likely to be, or is about to become, involved in a hazardous situation and/or uncomfortable dynamic situation. Data from various sensors may be fused together to provide input from multiple sensors. Determining fulfillment of the confirming condition may for instance be implemented by receiving signals, and/or reading parameters, settings in a table of a memory or flags, etc. The confirming time period may be arbitrarily selected as considered suitable for the implementation at hand, ranging from e.g., a few milliseconds to several hundreds of milliseconds.

Furthermore, by the retraction control system determining if there is fulfillment of an abort condition within a predetermined abort time period, it is judged whether there is fulfillment of an abort condition before the abort time period lapses. That is, the refraction control system gives the opportunity, within a set time frame, of taking into account input related to the vehicle no longer being considered likely to be, or about to become, involved in a hazardous situation and/or uncomfortable dynamic situation. Similarly to previous discussion, data from various sensors may be fused together to provide input from multiple sensors. Determining fulfillment of the abort condition may for instance be implemented by receiving signals, and/or reading parameters, settings in a table of a memory or flags, etc. The abort time period may be arbitrarily selected as considered suitable for the implementation at hand, ranging from e.g., a few milliseconds to several hundreds of milliseconds. For instance, the abort time period may be essentially equal to, or greater than, the confirming time period.

By the retraction control system generating a deactivation signal utilizable for aborting the initiation if either absence of the confirming condition is fulfilled within the confirming time period and/or the abort condition is fulfilled within the abort time period, the opportunity is provided to by means of the deactivation signal abort the retraction initiation. Thereby, the retraction of the seat belt may be aborted should the vehicle no longer be considered likely to be, or about to become, involved in a hazardous situation and/or uncomfortable dynamic situation. The deactivation signal may be provided to the reversible seat belt retractor arrangement in a similar manner as the previously discussed activation signal.

By the confirming time period and the abort time period respectively falling within a predetermined non-restraining time period characterizing the reversible seat belt retractor arrangement, during which non-restraining time period the reversible seat belt retractor arrangement is unable to apply a noticeable restraining force, by means of the seat belt, to the vehicle occupant, the initiated seat belt retraction may be aborted before the vehicle occupant even notices that retraction has been initiated. That is, since the reversible seat belt arrangement is unable to apply a restraining force noticeable to the vehicle occupant during the non-restraining time period characterizing the reversible seat belt retractor arrangement as a result of the delay associated with e.g., the reaction time of e.g., an electrical motor adapted to apply the restraining force of the seat belt and/or the delay associated with the seat belt being relatively loosely reeled and/or not being fully stretched on the reel, and since the deactivation signal is generated and subsequently received by the reversible seat belt arrangement prior to said non-restraining time period lapses, the vehicle occupant will be saved from experiencing discomfort by a restraining force of the seat belt. Accordingly, the retraction control system quickly reacts to an imminent hazardous situation and/or uncomfortable dynamic situation by initiating retraction at an early stage, while enabling for the seat belt retraction to be aborted before the vehicle occupant is subjected to a noticeable restraining force applied by the seat belt. Should neither absence of the confirming condition be fulfilled within the confirming time period and/or the abort condition be fulfilled within the abort time period, there is no generation of a deactivation signal. Accordingly, the initiated retraction may continue, and hence an applied restraining force of the seat belt may be noticeable to the vehicle occupant as the non-restraining time period lapses. The restraining force may be a force to the seat belt which is higher than a restraining force level applied to the seat belt during normal vehicle driving. "Noticeable restraining force" is throughout this disclosure intended to refer to a restraining force noticeable by the vehicle occupant, and is further intended to be interpreted to likewise refer to "essentially noticeable". Furthermore, "noticeable" may imply "uncomfortable".

The non-restraining time period may for instance range from tenths of milliseconds to several hundreds of milliseconds. According to one embodiment, the non-restraining time period may last for up to 200 milliseconds, preferably up to 100 milliseconds, and most preferably up to 50 milliseconds, where start of the non-restraining time period is counted from start of the retraction initiation. As previously discussed, the non-restraining time period is associated with the characteristics of the reversible seat belt retractor arrangement, and the shorter the non-restraining time period, the quicker may the reversible seat belt retractor arrangement apply a restraining force noticeable by the vehicle occupant. According to one example, the non-restraining time period may include additional time, e.g., ranging from a few tenths of milliseconds to hundreds of milliseconds, in addition to time related the delay occurring after generation of the activation signal until application of the restraining force is possible.

According to another embodiment, the confirming time period and/or the abort time period respectively is equal to the non-restraining time period. Thereby, the entire non-restraining time period may be utilized for re-evaluating received input or the lack thereof, to reconsider whether the vehicle still is, or no longer is, considered likely to be, or about to become, involved in a hazardous situation and/or uncomfortable dynamic situation. "Equal" is throughout this disclosure intended to be interpreted to likewise refer to "essentially equal" and "close to equal".

According to yet another embodiment, the hazardous situation and/or uncomfortable dynamic situation may refer to a road departure situation, such as e.g., the vehicle being airborne; and/or the vehicle approaching, or being subjected to, a ditch and/or rough terrain. Thereby, it is suggested that the retraction control takes measures even in situations not necessarily involving a vehicle collision, but involving situations potentially dangerous and/or alarming for the vehicle occupant. In order to determine such an imminent road departure situation, data from various sensors may, similarly to previous discussions, be fused together to provide input from multiple sensors.

According to one embodiment, fulfillment of the confirming condition may be based on a confirming input derived from the vehicle situation sensing system, which confirming input indicates that the vehicle, at a confirming time instant occurring later than the initiating time instant, still is considered likely to be, or about to become, involved in a hazardous situation and/or uncomfortable dynamic situation. Thereby, input provided from the vehicle situation sensing system may be utilized, either from the same e.g., sensors utilized for determining fulfillment of the activation condition, or partly the same sensors and/or other e.g., sensors, for determining fulfillment of the confirming condition. The confirming input may be provided and/or available in a similar manner as the initiating input. Accordingly, determining fulfillment of the confirming condition may for instance be implemented by receiving signals, and/or reading parameters, settings or flags, etc. The confirming time instant may be represented by any arbitrary point in time occurring after the initiating time instant, at which arbitrary point in time the confirming input indicates that the vehicle still is considered likely to be, or is about to become, involved in a hazardous situation and/or uncomfortable dynamic situation.

According to another embodiment, fulfillment of the abort condition may be based on an aborting input derived from the vehicle situation sensing system, which aborting input indicates that the vehicle, at an aborting time instant occurring later than the initiating time instant, is considered unlikely to be, or about to become, involved in a hazardous situation and/or uncomfortable dynamic situation. Thereby, input provided from the vehicle situation sensing system may be utilized, either from the same e.g., sensors utilized for determining fulfillment of the activation condition and/or the confirming condition, or partly the same sensors and/or other e.g., sensors, for determining fulfillment of the abort condition. The aborting input may be provided and/or available in a similar manner as the initiating input and/or the confirming input. Accordingly, determining fulfillment of the abort condition may for instance be implemented by receiving signals, and/or reading parameters, settings or flags, etc. The aborting time instant may be represented by any arbitrary point in time occurring after the initiating time instant, at which arbitrary point in time the aborting input indicates that the vehicle no longer is considered likely to be, or is about to become, involved in a hazardous situation and/or uncomfortable dynamic situation.

According to yet another embodiment, the retraction control system may determine fulfillment of an activation condition based on an initiating input derived from a vehicle situation sensing system comprising one or a combination of collision avoidance sensors, such as e.g., radar, IR, ultrasonic, vision based and/or lidar sensors; vehicle dynamics sensors, such as e.g., accelerometers and/or angular rate sensors; and/or further sensors associated with one or several airbags of the vehicle. Thereby, the refraction control system may utilize relevant input from commonly known sensors already implemented and utilized for other functionality beyond the scope of this disclosure.

According to one embodiment, the retraction control system further generates the deactivation signal utilizable for aborting the retraction initiation if the retraction control system determines fulfillment of a reset condition. Thereby, it is judged whether there is fulfillment of a reset condition, which reset condition, unlike the confirming condition and abort condition, not is restricted to occur within a set period of time in order to enable interruption of the initiated refraction. That is, the retraction control system gives the opportunity of taking into account input related to the vehicle no longer being considered likely to be, or about to become, involved in a hazardous situation and/or uncomfortable dynamic situation, without taking into account timing restrictions. Accordingly, fulfillment of the reset condition may occur even after an applied restraining force of the seat belt is noticeable by the vehicle occupant, and may hence be utilized as a release function of the retraction (restraining) should the vehicle no longer be considered likely to be, or about to become, involved in a hazardous situation and/or uncomfortable dynamic situation, or after a collision situation. Similarly to previous discussion, data from various sensors may be fused together to provide input from multiple sensors. Furthermore, determining fulfillment of the abort condition may for instance be implemented by receiving signals, and/or reading parameters, settings in a table of a memory or flags, etc. Alternatively and/or additionally, the reset condition may be associated with a global release criterion, commonly known within the automotive sector.

According to a further embodiment, fulfillment of the reset condition may be based on a reset input derived from the vehicle situation sensing system, which reset condition indicates that the vehicle, at a reset time instant occurring later than the initiating time instant, no longer is considered to be involved in a hazardous situation and/or uncomfortable dynamic situation. Thereby, input provided from the vehicle situation sensing system may be utilized, either from the same e.g., sensors utilized for determining fulfillment of the activation condition, confirming and/or the abort condition, or partly the same sensors and/or other e.g., sensors, for determining fulfillment of the reset condition. The reset input may be provided and/or available in a similar manner as the initiating input, confirming input and/or the aborting input. Accordingly, determining fulfillment of the reset condition may for instance be implemented by receiving signals, and/or reading parameters, settings or flags. The reset time instant may be considered any arbitrary point in time occurring after the initiating time instant, at which arbitrary point in time reset input indicates that the vehicle no longer is considered to be involved in a hazardous situation and/or uncomfortable dynamic situation.

According to one embodiment, the activation signal and the deactivation signal may be represented by a common signal, which common signal is toggled to indicate respectively the activation signal and the deactivation signal. Thereby, a convenient and feasible implementation of the activation signal and the deactivation signal is provided.

According to a second aspect of embodiments herein, the object is achieved by a refraction control system of a vehicle for controlling retraction of a seat belt of a reversible seat belt refractor arrangement for a vehicle occupant. The retraction control system comprises a determining unit adapted for determining fulfillment of an activation condition based on an initiating input derived from a vehicle situation sensing system, which initiating input indicates that the vehicle, at an initiating time instant, is considered likely to be, or is about to become, involved in a hazardous situation and/or uncomfortable dynamic situation. The retraction control system further comprises a generating unit adapted for generating an activation signal utilizable for initiation of retraction of the seat belt. The generating unit is further adapted for generating a deactivation signal utilizable for aborting the initiation if determining, by the determining unit, absence of fulfillment of a confirming condition within a predetermined confirming time period, and/or if determining, by the determining unit, fulfillment of an abort condition within a predetermined abort time period. The confirming time period and the abort time period respectively fall within a predetermined non-restraining time period characterizing the reversible seat belt retractor arrangement, during which non-restraining time period the reversible seat belt refractor arrangement is unable to apply a noticeable restraining force, by means of the seat belt, to the vehicle occupant. Similar advantages as those mentioned in the foregoing correspondingly apply, why these are not further discussed.

According to a third aspect of embodiments herein, the object is achieved by a reversible seat belt retractor system of a vehicle for a vehicle occupant, which reversible seat belt refractor system comprises a reversible seat belt retractor arrangement, and the previously discussed refraction control system, for controlling retraction of a seat belt of the reversible seat belt retractor arrangement for the vehicle occupant. Yet again, similar advantages as those mentioned in the foregoing correspondingly apply, why these are not further discussed.

According to a fourth aspect of embodiments herein, the object is achieved by a vehicle comprising the previously discussed reversible seat belt retractor system; a vehicle situation sensing system adapted to provide input to the reversible seat belt retractor system; and a vehicle seat for a vehicle occupant, at which vehicle seat the reversible seat belt retractor arrangement of the reversible seat belt retractor system is arranged. Yet again, similar advantages as those mentioned in the foregoing correspondingly apply, why these are not further discussed.

It should be understood that the activation condition, the confirming condition, the abort condition and/or the optional reset condition, when no longer applicable and/or when situations to which they respectively are associated have ceased, may be reset in a commonly known fashion.

BRIEF DESCRIPTION OF THE DRAWINGS

Various aspects of non-limiting embodiments of the present disclosure, including particular features and advantages, will be readily understood from the following detailed description and the accompanying drawings, in which:

FIG. 3 (3a-3c) shows exemplifying scenarios of varying fulfillment of different conditions according to embodiments of the disclosure.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to controlling refraction of a seat belt of a reversible seat belt retractor arrangement for a vehicle occupant, there will be disclosed how, by making use of the inability of the reversible seat belt retractor arrangement to momentarily apply a noticeable restraining force of the seat belt to the vehicle occupant, i.e., making use of the delay occurring after generation of the activation signal until application of the restraining force is possible, thus utilizing the reaction time of e.g., an electrical motor adapted to apply the restraining force of the seat belt and/or utilizing the delay associated with the "slack" of the seat belt on a reel of the reversible seat belt retractor arrangement resulting from the seat belt being relatively loosely reeled and/or not being fully stretched on the reel, the retraction control system is given time to reconsider whether or not to abort the initiated retraction before the vehicle occupant is affected by a restraining force.

Figure 1:
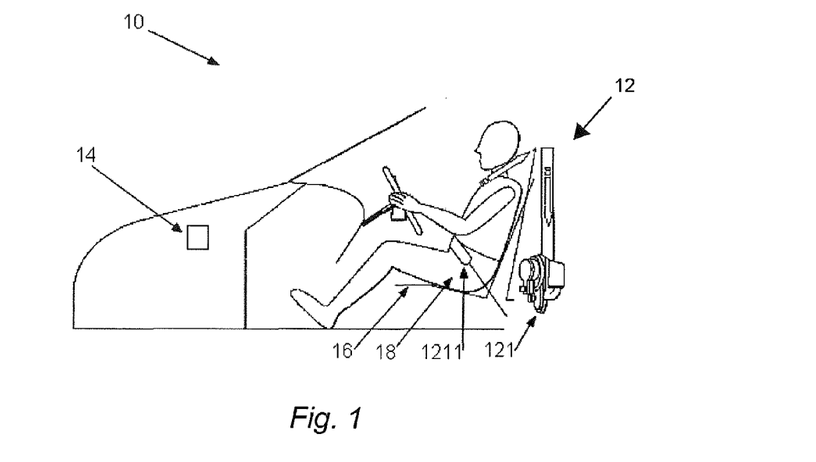
FIG. 1 illustrates an exemplifying vehicle comprising a reversible seat belt refractor system according to embodiments of the disclosure.

Referring now to the figures and FIG. 1 in particular, there is depicted an exemplifying vehicle 10 comprising a reversible seat belt retractor system 12 according to embodiments of the disclosure. The vehicle 10 of FIG. 1 is a passenger car, although according to other embodiments, other suitable vehicles are likewise feasible. The vehicle 10 further comprises a vehicle situation sensing system 14 adapted to provide input to the reversible seat belt retractor system 12. The vehicle situation sensing system 14 is here depicted as a single entity, although in reality, the vehicle situation sensing system 14 may be comprised of several devices distributed at a plurality of positions throughout the vehicle 10. The vehicle sensing system 14 of FIG. 1 comprises one or a combination of collision avoidance sensors, such as e.g., radar, IR, ultrasonic, vision based and/or lidar sensors; vehicle dynamics sensors, such as e.g., accelerometers and/or angular rate sensors; and/or further sensors associated with one or several airbags of the vehicle 10.

The vehicle 10 further comprises a vehicle seat 16 for a vehicle occupant 18, at which vehicle seat 16 a reversible seat belt retractor arrangement 121 of the reversible seat belt retractor system 12 is arranged. The reversible seat belt retractor arrangement 121 comprises a seat belt 1211. The seat belt 1211 may be utilized for restraining the vehicle occupant 18 to the vehicle seat 16.

Figure 2:
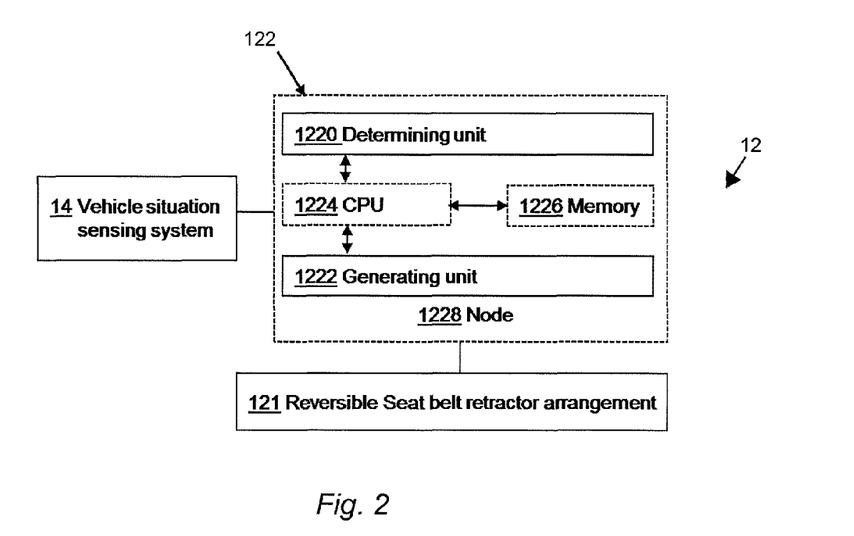
FIG. 2 is a schematic block diagram illustrating an exemplifying reversible seat belt retractor system according to embodiments of the disclosure.

As further shown in FIG. 2, which depicts a schematic block diagram illustrating an exemplifying reversible seat belt retractor system 12 according to embodiments of the disclosure, the reversible seat belt retractor system 12 additionally comprises a retraction control system 122, for controlling retraction of the seat belt 1211 of the reversible seat belt retractor arrangement 121 for the vehicle occupant 18. The refraction control system 122 comprises a determining unit 1220 and a generating unit 1222. Furthermore, the embodiments herein for controlling retraction of the seat belt 1211 of the reversible seat belt retractor arrangement 121 for the vehicle occupant 18 may be implemented through one or more processors, such as a processor 1224, here denoted CPU (Central Processing Unit), together with computer program code for performing the functions and actions of the embodiments herein. Said program code may also be provided as a computer program product, for instance in the form of a data carrier carrying computer program code for performing the embodiments herein when being loaded into the retraction control system 122. One such carrier may be in the form of a CD ROM disc. It is however feasible with other data carriers such as a memory stick. The computer program code may furthermore be provided as pure program code on a server and downloaded to the retraction control system 122, for instance in an assembly plant, workshop or at a facility of the supplier. The refraction control system 122 may further comprise a memory 1226 comprising one or more memory units. The memory 1226 may be arranged to be used to store e.g., information, and further to store data; initiating, confirming, aborting and/or reset input; and/or activation, confirming, abort and/or reset conditions; and applications, to perform the methods herein when being executed in the retraction control system 122. The processor 1224, the memory 1226, the determining unit 1220 and the generating unit 1222 may for instance be implemented in one or several arbitrary nodes 1228, preferably although not necessarily, arranged locally on-board the vehicle. Said node 1228 may be an electronic control unit (ECU) or any suitable generic electronic device, and may involve one or a combination of for instance an airbag node or main central node, or a control unit associated with the reversible seat belt refractor arrangement 121. Those skilled in the art will also appreciate that the determining unit 1220 and the generating unit 1222 described above may refer to a combination of analog and digital circuits, and/or one or more processors configured with software and/or firmware, e.g., stored in a memory such as the memory 1226, that when executed by the one or more processors such as the processor 1224 perform as will be described in more detail later on in this description. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

FIG. 3 shows exemplifying scenarios of varying fulfillment of different conditions according to embodiments of the disclosure. An activation condition C-Activate, a confirming condition C-Confirm, an abort condition C-Abort, and a reset condition C-Reset and their respective varying fulfillment—shown as going from a lower to a higher level—is visualized as varying along a time line t. Further visualized are an activation signal S-Activation and a deactivation signal S-Deactivation, which combined are represented by a common signal S-Common. Generation of the activation signal S-Activation, which occurs simultaneously or slightly after fulfillment of the activation condition C-Activate, is shown as the common signal S-Common going from a lower to a higher level, and generation of the deactivation signal S-Deactivation is shown as the common signal S-Common going from the higher level to the lower. FIG. 3 further illustrates exemplifying time instances; a first time instant T1 at which the activation condition C-activate is fulfilled, a second time instant T2 up to which—from the first time instant T1—a confirming time period ΔC ranges, a third time instant T3 up to which—from the first time instant T1—an abort time period ΔA ranges, and a fourth time instant T4 up to which—from the first time instant T1—a non-restraining time period ΔN-R ranges.

Figure 3A:
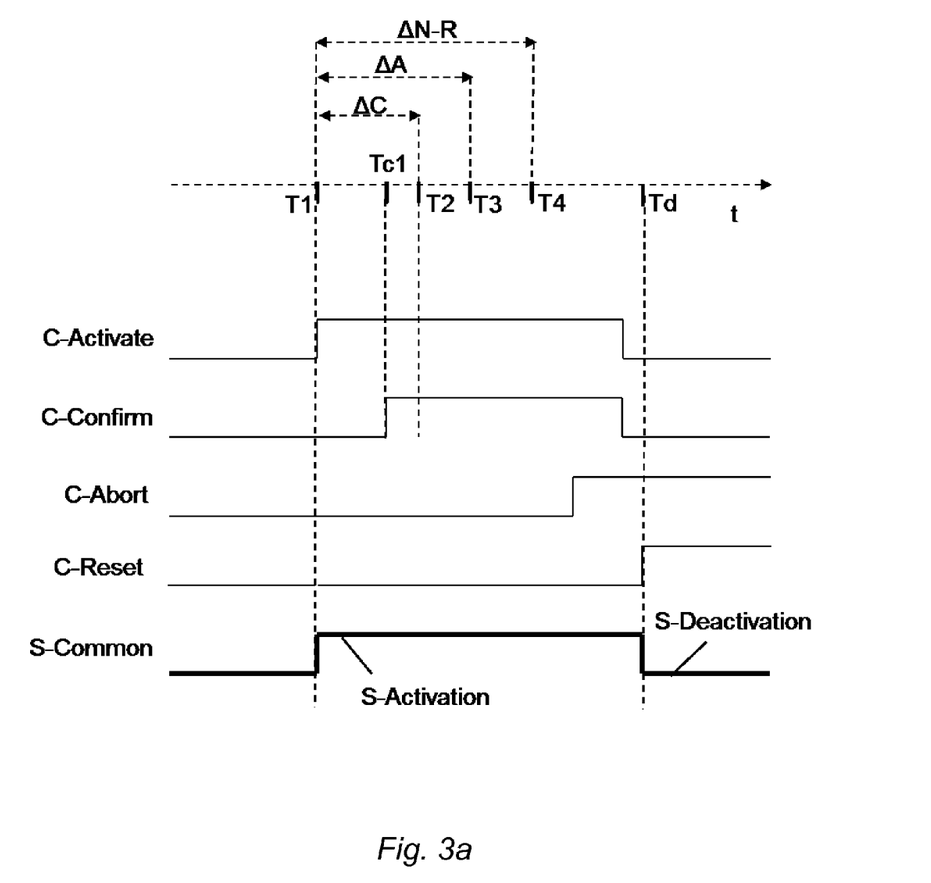

FIG. 3a, specifically, illustrates an exemplifying situation where the vehicle 10 is confirmed to be considered likely to be, or about to become, involved in a hazardous situation and/or uncomfortable dynamic situation. This is represented by fulfillment of the confirming condition C-Confirm at a confirming fulfillment time instant Tc1, which is illustrated to occur prior to the second time instant T2, i.e., prior to the confirming time period ΔC lapses. Furthermore, as visualized in FIG. 3a, the confirming fulfillment time instant Tc1 occurring at fulfillment of the confirming condition C-Confirm, may coincide, or essentially coincide, with a confirming time instant, at which confirming time instant a confirming input indicates that the vehicle 10 still is considered likely to be, or about to become, involved in a hazardous situation and/or uncomfortable dynamic situation. Since the confirming fulfillment time instant Tc1 falls within the confirming time period ΔC, an initiated seat belt refraction may continue. Subsequently, an applied restraining force of the seat belt 1211 may be noticeable to the vehicle occupant 18 as the non-restraining time period ΔN-R lapses. Additionally, a deactivating time instant Td indicates fulfillment of the reset condition C-Reset. As visualized in FIG. 3a, the reset fulfillment time instant Td occurring at fulfillment of the reset condition C-Reset, may coincide, or essentially coincide, with a reset time instant, at which reset time instant a reset input indicates that the vehicle 10 no longer is considered to be involved in a hazardous situation and/or uncomfortable dynamic situation.

Figure 3B:
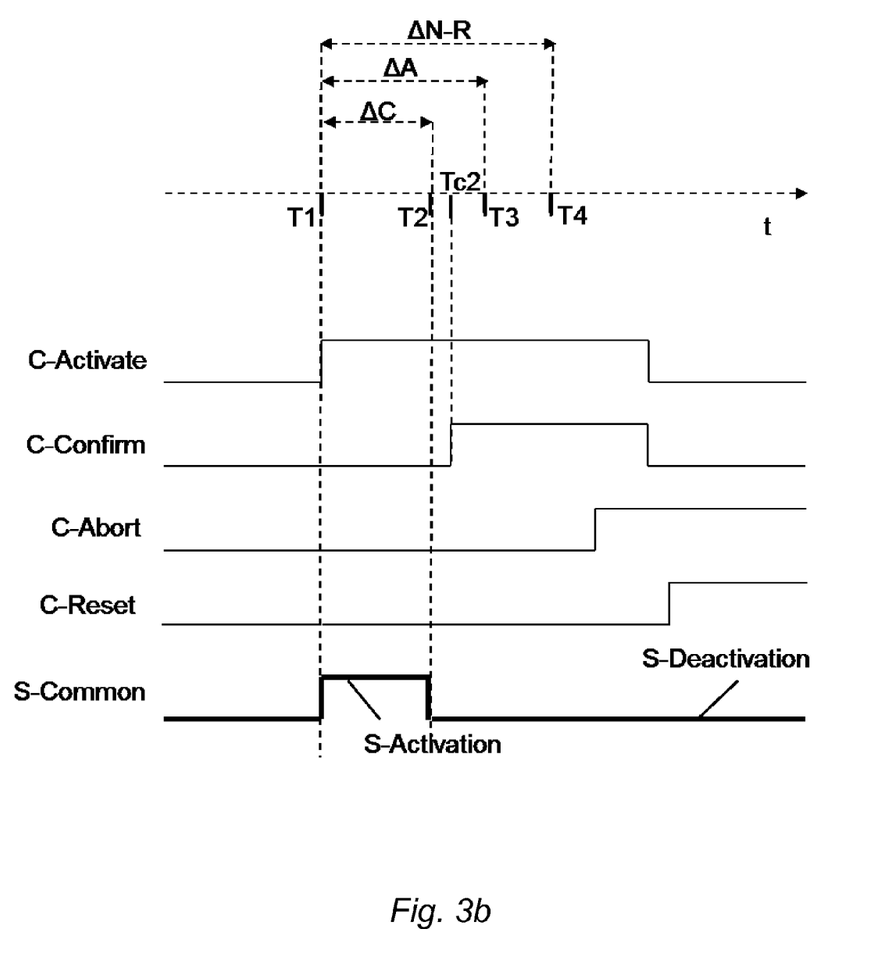

FIG. 3b illustrates, as opposed to FIG. 3a, an exemplifying situation where the vehicle 10 is not confirmed to be considered likely to be, or about to become, involved in a hazardous situation and/or uncomfortable dynamic situation. This is represented by absence of fulfillment of the confirming condition C-Confirm within the confirming time period ΔC, i.e., prior to the second time instant T2. In the illustrated example of FIG. 3b, a fulfilment of the confirming condition C-Confirm takes place at a late confirming fulfillment time instant Tc2 which occurs after the confirming time period ΔC has lapsed, i.e., after the second time instant T2. Furthermore, as visualized in FIGS. 3b, the late confirming fulfillment time instant Tc2 occurring at fulfillment of the confirming condition C-Confirm, may coincide, or essentially coincide, with the confirming time instant, at which confirming time instant the confirming input indicates that the vehicle 10 still is considered likely to be, or about to become, involved in a hazardous situation and/or uncomfortable dynamic situation. Since the late confirming fulfillment time instant Tc2 occurs after the confirming time period ΔC has lapsed rather than prior thereto, an initiated seat belt retraction may be aborted before an applied restraining force of the seat belt 1211 may be noticeable to the vehicle occupant 18. As an alternative, un-fulfillment of the confirming condition C-Confirm is a likely scenario.

Figure 3C:
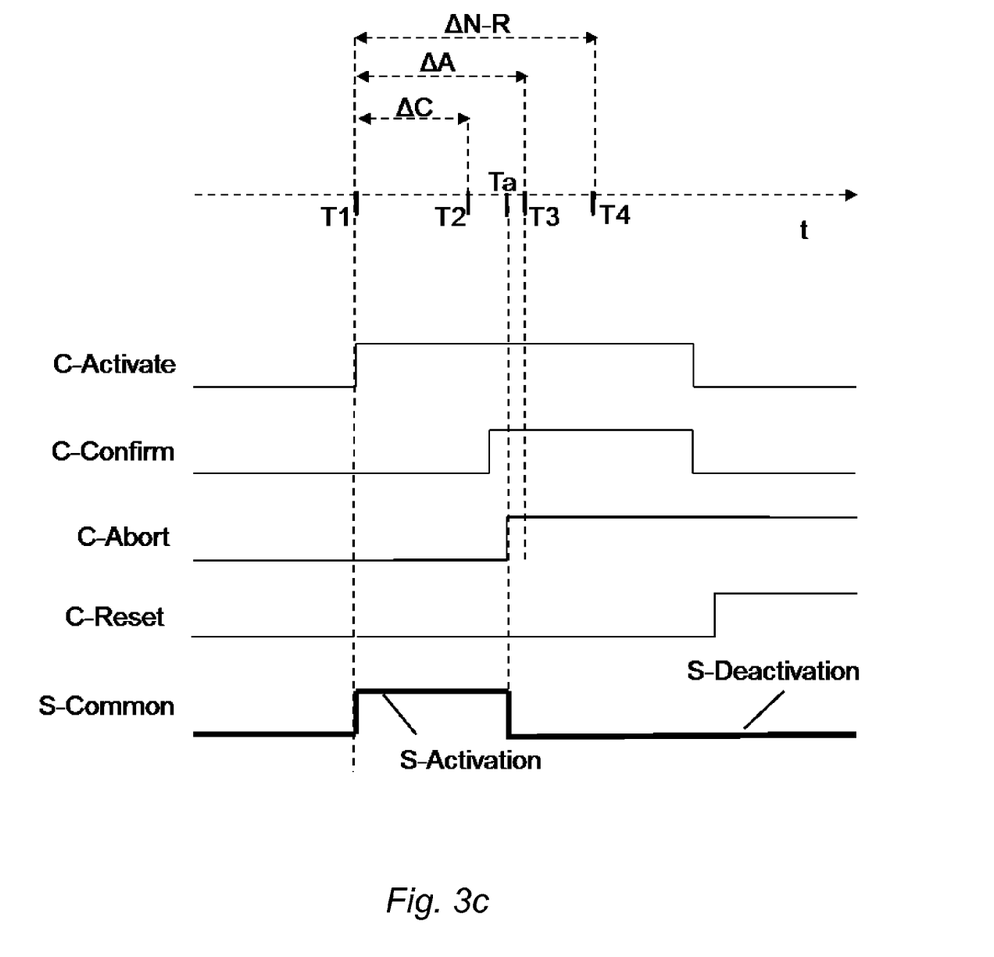

FIG. 3c illustrates, as opposed to FIGS. 3a and 3b, an exemplifying situation where the vehicle 10 is confirmed to be considered unlikely to be, or about to become, involved in a hazardous situation and/or uncomfortable dynamic situation. This is represented by fulfillment of the abort condition C-Abort within the confirming time period ΔA, i.e., prior to the third time instant T3. In the illustrated example of FIG. 3c, fulfilment of the abort condition C-Abort takes place at an abort fulfillment time instant Ta which is illustrated to occur prior to the third time instant T3, i.e., prior to the abort time period ΔA lapses. As visualized in FIG. 3c, the abort fulfillment time instant Ta occurring at fulfillment of the abort condition C-Abort, may coincide, or essentially coincide, with an aborting time instant, at which aborting time instant an aborting input indicates that the vehicle 10 is considered unlikely to be, or about to become, involved in a hazardous situation and/or uncomfortable dynamic situation. Since the abort fulfillment time instant Ta falls within the abort time period ΔA, an initiated seat belt retraction may be aborted before an applied restraining force of the seat belt 1211 may be noticeable to the vehicle occupant 18.

Figure 4:
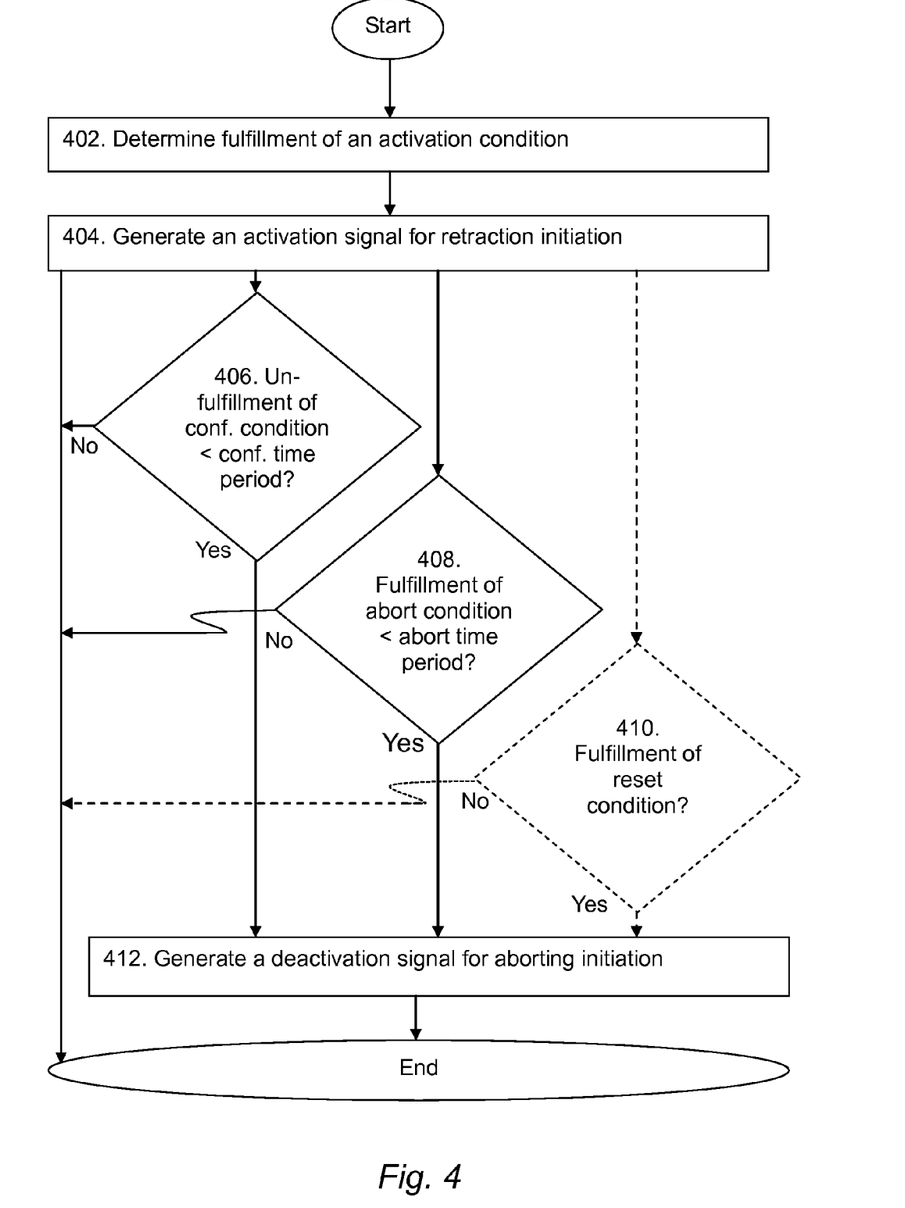
FIG. 4 is a flowchart depicting an exemplifying method performed by a retraction control system of a vehicle for controlling retraction of a seat belt of a reversible seat belt refractor arrangement for a vehicle occupant according to embodiments of the disclosure.

FIG. 4 is a flowchart depicting an exemplifying method performed by the retraction control system 122 of the vehicle 10 for controlling retraction of the seat belt 1211 of the reversible seat belt retractor arrangement 121 for the vehicle occupant 18 according to embodiments of the disclosure. The exemplifying method, which may be continuously or intermittently repeated, comprises the following actions discussed with support from FIGS. 1-3. The actions may be taken in any suitable order and, where suitable, in parallel.

Action 402

In Action 402, the retraction control system 122 determines fulfillment of the activation condition C-Activate based on an initiating input derived from the vehicle situation sensing system 14. The initiating input indicates that the vehicle 10, at an initiating time instant, is considered likely to be, or is about to become, involved in a hazardous situation and/or uncomfortable dynamic situation.

As visualized in FIG. 3, fulfillment of the activation condition C-Activate is illustrated to occur at the first time instant T1. Furthermore, the first time instant T1 occurring at fulfillment of the activation condition C-Activate, may coincide, or essentially coincide, with the initiating time instant, at which initiating time instant the initiating input indicates that the vehicle 10, is considered likely to be, or is about to become, involved in a hazardous situation and/or uncomfortable dynamic situation.

The hazardous situation and/or uncomfortable dynamic situation may refer to a road departure situation, such as e.g., the vehicle 10 being airborne; and/or the vehicle 10 approaching, or being subjected to, a ditch and/or rough terrain.

Action 404

In Action 404, the retraction control system 122 generates the activation signal S-Activation utilizable for initiation of retraction of the seat belt 1211. As visualized in FIG. 3, generation of the activation signal S-Activation is illustrated to occur essentially at the first time instant T1, that is essentially simultaneously with, or slightly after, determination of fulfillment of the activation condition C-Activate (Action 402).

Action 406

In Action 406, the retraction control system 122 determines if there is absence of fulfillment of the confirming condition C-Confirm within the predetermined confirming time period $\Delta C$.

If there is no absence of fulfillment of the confirming condition C-Confirm within the confirming time period $\Delta C$, i.e., "NO" is the result of the determining step of Action 406 as presence of fulfillment of the confirming condition C-Confirm has been detected, the method is ended. This implies, as visualized in FIG. 3a, that fulfillment of the confirming condition C-Confirm has occurred within the confirming time period $\Delta C$, at the confirming fulfillment time instant Tc1.

On the other hand, if absence of the confirming condition C-Confirm is fulfilled within the confirming time period $\Delta C$, i.e., "YES" is the result of the determining step of Action 406 as no presence of fulfillment of the confirming condition C-Confirm has been detected, the method continues with Action 412. This implies, as visualized in FIG. 3b, that a fulfillment of the confirming condition C-Confirm may, or may not have, occurred after the confirming time period $\Delta C$ has lapsed, i.e., after the second time instant T2, potentially at the late confirming fulfillment time instant Tc2.

Fulfillment of the confirming condition C-Confirm may be based on the confirming input derived from the vehicle situation sensing system 14. The confirming input indicates that the vehicle 10, at the confirming time instant occurring later than the initiating time instant, still is considered likely to be, or about to become, involved in a hazardous situation and/or uncomfortable dynamic situation.

Action 408

In Action 408, the retraction control system 122 determines if there is fulfillment of the abort condition C-Abort within the predetermined abort time period $\Delta A$.

If there is no abort condition C-Abort fulfilled within the abort time period $\Delta A$, i.e., "NO" is the result of the determining step of Action 408, the method is ended.

On the other hand, if the abort condition C-Abort is fulfilled within the abort time period $\Delta A$, i.e., "YES" is the result of the determining step of Action 408, the method continues with Action 412. This implies, as visualized in FIG. 3c, that fulfillment of the abort condition C-Abort has occurred within the abort time period $\Delta A$, at the abort fulfillment time instant Ta.

The confirming time period $\Delta C$ and the abort time period $\Delta A$ respectively fall within a predetermined non-restraining time period $\Delta N$-R characterizing the reversible seat belt retractor arrangement 121. During the non-restraining time period $\Delta N$-R, the reversible seat belt retractor arrangement 121 is unable to apply a noticeable restraining force, by means of the seat belt 1211, to the vehicle occupant 18.

Fulfillment of the abort condition C-Abort may be based on the aborting input derived from the vehicle situation sensing system 14. The aborting input indicates that the vehicle 10, at the aborting time instant occurring later than the initiating time instant, is considered unlikely to be, or about to become, involved in a hazardous situation and/or uncomfortable dynamic situation.

The non-restraining time period $\Delta N$-R may last for up to 200 milliseconds, preferably up to 100 milliseconds, and most preferably up to 50 milliseconds. Start of the non-restraining time period $\Delta N$-R may be counted from start of the retraction initiation, which may coincide with the first time instant T1.

Furthermore, the confirming time period $\Delta C$ and/or the abort time period $\Delta A$ may respectively be equal to the non-restraining time period $\Delta N$-R.

Action 410

In optional Action 410, the refraction control system 122 determines if there is fulfillment of the reset condition C-Reset.

If there is no reset condition C-Reset fulfilled, i.e., "NO" is the result of the determining step of Action 410, the method is ended.

On the other hand, if the reset condition C-Reset is fulfilled, i.e., "YES" is the result of the determining step of Action 410, the method continues with Action 412. This implies, as visualized in FIG. 3a, that a fulfillment of the reset condition C-Reset has occurred at the deactivating time instant Td.

Fulfillment of the reset condition C-Reset may be based on the reset input derived from the vehicle situation sensing system 14. The reset condition C-Reset indicates that the vehicle 10, at the reset time instant occurring later than the initiating time instant, no longer is considered to be involved in a hazardous situation and/or uncomfortable dynamic situation.

Action 412

In Action 412, the retraction control system 122 generates a deactivation signal S-Deactivation utilizable for aborting the initiation. As visualized in FIG. 3, the deactivation signal S-Deactivation is illustrated to occur at, or slightly after, the reset fulfillment time instant Td, the second time instant T2, i.e., when the confirming time period $\Delta C$ has lapsed, and at the abort fulfillment time instant Ta, respectively; here denoted by the common signal S-Common going from a higher level to a lower.

The activation signal S-Activation and the deactivation signal S-Deactivation may be represented by the common signal S-Common. The common signal S-Common may be toggled to indicate respectively the activation signal S-Activation and the deactivation signal S-Deactivation, as illustrated in FIG. 3.

Consequently, the provision of the retraction control system 122 for controlling refraction of the seat belt 1211 of the reversible seat belt retractor arrangement 121 for the vehicle occupant 18 thus enables the retraction control system 122 to quickly react to an imminent hazardous situation and/or uncomfortable dynamic situation by initiating retraction at an early stage. At the same time, the imminent hazardous situation and/or uncomfortable dynamic situation may be re-evaluated and the initiated retraction potentially aborted prior to the vehicle occupant 18 experiencing discomfort by a restraining force of the seat belt 1211. That is, since the confirming time period $\Delta C$ and the abort time period $\Delta A$ respectively do not extend beyond the non-restraining time period $\Delta N$-R during which the reversible seat belt retractor arrangement 121 is unable to apply a noticeable restraining force to the vehicle occupant 18, the initiation of retraction of the seat belt 1211 may, if absence of fulfillment of the confirming condition C-Confirm within the confirming time period $\Delta C$ is determined and/or if fulfillment of the abort condition C-Abort within the abort time period $\Delta A$ is determined, be aborted before the vehicle occupant 18 is subjected to a noticeable restraining force.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method performed by a retraction control system of a vehicle for controlling retraction of a seat belt of a reversible seat belt retractor arrangement for a vehicle occupant, the method comprising:
   determining fulfillment of an activation condition (C-Activate) based on an initiating input derived from a vehicle situation sensing system, the initiating input indicating that the vehicle, at an initiating time instant, is considered likely to be involved in at least one of a hazardous situation or a non-standard dynamic situation;
   generating, by the retraction control system, an activation signal (S-Activation) utilizable by the reversible seat belt retractor arrangement for initiation of retraction of the seat belt; and
   upon determining at least one of absence of fulfillment of a confirming condition (C-confirm) within a predetermined confirming time period ($\Delta C$), or
   fulfillment of an abort condition (C-Abort) within a predetermined abort time period ($\Delta A$),
   generating, by the retraction control system, a deactivation signal (S-Deactivation) that is utilized by the reversible seat belt retractor arrangement for aborting the initiation of retraction of the seat belt;
   wherein the confirming time period ($\Delta C$), if utilized. and the abort time period ($\Delta A$), if utilized, respectively fall within a predetermined non-restraining time period ($\Delta N\text{-}R$) characterizing the reversible seat belt retractor arrangement, during which non-restraining time period ($\Delta N\text{-}R$) no restraining force is applied by the reversible seat belt retractor arrangement by means of the seat belt to the vehicle occupant after generation of the activation signal (S-Activation).

2. The method according to claim 1 wherein the non-restraining time period ($\Delta N\text{-}R$) lasts for up to 200 milliseconds, and wherein start of the non-restraining time period ($\Delta N\text{-}R$) is counted from start of the initiation of retraction of the seat belt.

3. The method according to claim 1 wherein the non-restraining time period ($\Delta N\text{-}R$) lasts for up to 100 milliseconds, and wherein start of the non-restraining time period ($\Delta N\text{-}R$) is counted from start of the initiation of retraction of the seat belt.

4. The method according to claim 1 wherein the non-restraining time period ($\Delta N\text{-}R$) lasts for up to 50 milliseconds, and wherein start of the non-restraining time period ($\Delta N\text{-}R$) is counted from start of the initiation of retraction of the seat belt.

5. The method according to claim 1 wherein the confirming time period ($\Delta C$) or the abort time period ($\Delta A$) is equal to the non-restraining time period ($\Delta N\text{-}R$).

6. The method according to claim 1 wherein the hazardous situation and/or non-standard dynamic situation refers to a road departure situation.

7. The method according to claim 1 wherein fulfillment of the confirming condition (C-Confirm) is based on a confirming input derived from the vehicle situation sensing system, the confirming input indicating that the vehicle, at a confirming time instant occurring later than the initiating time instant, still is considered likely to be involved in at least one of a hazardous situation or a non-standard dynamic situation.

8. The method according to claim 1 wherein fulfillment of the abort condition (C-Abort) is based on an aborting input derived from the vehicle situation sensing system, the aborting input indicating that the vehicle, at an aborting time instant occurring later than the initiating time instant, is considered unlikely to be, or about to become, involved in at least one of a hazardous situation or a non-standard dynamic situation.

9. The method according to claim 1 wherein the determining fulfillment of the activation condition (C-Activate) comprises determining fulfillment of an activation condition (C-Activate) based on an initiating input derived from a vehicle situation sensing system comprising one or more collision avoidance sensors.

10. The method according to claim 9 wherein the one or more collision avoidance sensors comprise one or more of radar, IR, ultrasonic, vision based or lidar sensors; vehicle dynamics sensors; or further sensors associated with one or several airbags of the vehicle.

11. The method according to claim 1 further comprising:
    upon determining fulfillment of a reset condition (C-Reset), generating the deactivation signal (S-Deactivation) utilizable for aborting the initiation of retraction of the seat belt.

12. The method according to claim 11 wherein fulfillment of the reset condition (C-Reset) is based on a reset input derived from the vehicle situation sensing system, the reset condition (C-Reset) indicating that the vehicle, at a reset time instant occurring later than the initiating time instant, no longer is considered to be involved in at least one of a hazardous situation or a non-standard dynamic situation.

13. The method according to claim 1 wherein the activation signal (S-Activation) and the deactivation signal (S-Deactivation) are represented by a common signal (S-Common), which common signal (S-Common) is toggled to indicate respectively the activation signal (S-Activation) and the deactivation signal (S-Deactivation).

14. A retraction control system of a vehicle for controlling retraction of a seat belt of a reversible seat belt retractor arrangement for a vehicle occupant, the retraction control system comprising:
    a processing unit including a processor that is operable to execute code such that the retraction control system is operable to
    determine fulfillment of an activation condition (C-Activate) based on an initiating input derived from a vehicle situation sensing system, the initiating input indicating that the vehicle, at an initiating time instant, is considered likely to be involved in at least one of a hazardous situation or a non-standard dynamic situation;

generate an activation signal (S-Activation) utilizable by the reversible seat belt retractor arrangement for initiation of retraction of the seat belt; and generate a deactivation signal (S-Deactivation) that is utilized by the reversible seat belt retractor arrangement for aborting the initiation of retraction of the seat belt if at least one of absence of fulfillment of a confirming condition (C-Confirm) within a predetermined confirming time period ($\Delta C$) fulfillment of an abort condition (C-Abort) within a predetermined abort time period ($\Delta A$) is determined, and wherein the confirming time period ($\Delta C$), if utilized, and the abort time period ($\Delta A$), if utilized, respectively fall within a predetermined non-restraining time period ($\Delta N$-R) characterizing the reversible seat belt retractor arrangement, during which non-restraining time period ($\Delta N$-R) no restraining force is applied b the reversible seat belt retractor arrangement by means of the seat belt to the vehicle occupant after generation of the activation signal (S-Activation).

15. A reversible seat belt retractor system of a vehicle for a vehicle occupant, the reversible seat belt retractor system comprising:

a reversible seat belt retractor arrangement; and the retraction control system according to claim 14 configured to control retraction of a seat belt of the reversible seat belt retractor arrangement for the vehicle occupant.

16. A vehicle comprising:

the reversible seat belt retractor system according to claim 15;

a vehicle situation sensing system adapted to provide input to the reversible seat belt retractor system; and a vehicle seat for a vehicle occupant, at which vehicle seat the reversible seat belt retractor arrangement of the reversible seat belt retractor system is arranged.

* * * * *

UNITED STATES PATENT AND TRADEMARK OFFICE
CERTIFICATE OF CORRECTION

| | | |
|---|---|---|
| PATENT NO. | : 9,457,750 B2 | Page 1 of 1 |
| APPLICATION NO. | : 14/282455 | |
| DATED | : October 4, 2016 | |
| INVENTOR(S) | : Par Nilsson et al. | |

It is certified that error appears in the above-identified patent and that said Letters Patent is hereby corrected as shown below:

In the claims

Column 17, Line 19, Claims 14:

after "no restraining force is applied"
Delete "b" and
Insert -- by --.

Signed and Sealed this
Thirteenth Day of December, 2016

Michelle K. Lee
*Director of the United States Patent and Trademark Office*